United States Patent
Sevindik et al.

(10) Patent No.: US 10,966,264 B2
(45) Date of Patent: Mar. 30, 2021

(54) MULTI-STATION SUPPORT OF WIRELESS COMMUNICATIONS

(71) Applicant: CHARTER COMMUNICATIONS OPERATING, LLC, Saint Louis, MO (US)

(72) Inventors: Volkan Sevindik, Reston, VA (US); Haider H. Syed, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 88 days.

(21) Appl. No.: 16/118,073

(22) Filed: Aug. 30, 2018

(65) Prior Publication Data

US 2020/0077457 A1    Mar. 5, 2020

(51) Int. Cl.
*H04W 76/15*    (2018.01)
*H04W 24/08*    (2009.01)
*H04W 72/08*    (2009.01)

(52) U.S. Cl.
CPC .......... *H04W 76/15* (2018.02); *H04W 24/08* (2013.01); *H04W 72/085* (2013.01)

(58) Field of Classification Search
CPC .... H04W 76/15; H04W 72/085; H04W 24/08
See application file for complete search history.

(56) References Cited

U.S. PATENT DOCUMENTS

| | | | |
|---|---|---|---|
| 10,419,943 B1* | 9/2019 | Wong | H04W 72/085 |
| 2011/0077010 A1* | 3/2011 | Xu | H04W 24/10 455/437 |
| 2015/0195801 A1* | 7/2015 | Kim | H04W 52/48 370/329 |
| 2015/0382336 A1* | 12/2015 | Zhang | H04L 1/0003 370/329 |
| 2016/0338132 A1* | 11/2016 | Uchino | H04W 28/0289 |
| 2016/0374077 A1* | 12/2016 | Fukuta | H04W 76/15 |
| 2017/0164338 A1* | 6/2017 | Kalhan | H04L 5/0053 |
| 2018/0084539 A1* | 3/2018 | Kubota | H04W 76/15 |
| 2018/0115908 A1* | 4/2018 | Wang | H04W 52/50 |
| 2018/0124792 A1* | 5/2018 | Khoshnevisan | H04B 17/345 |
| 2019/0335337 A1* | 10/2019 | Damnjanovic | H04W 16/14 |

OTHER PUBLICATIONS

International Search Report, PCT/US2019/046287, dated Oct. 24, 2019, pp. 15.

* cited by examiner

*Primary Examiner* — Will W Lin
(74) *Attorney, Agent, or Firm* — Armis IP Law, LLC

(57) ABSTRACT

A communication system includes a control wireless station. One or more data payload-conveying wireless stations rely on the control wireless station to provide control information to a mobile communication device to control conveyance of data over one or more data channels to the mobile communication device. For example, to connect to a remote network, a mobile communication device establishes a first wireless communication link with the control wireless station. The mobile communication device establishes a second wireless communication link with a data conveying wireless station. The first wireless link conveys control information from the control wireless station to the mobile communication device. The second wireless link conveys data payload information. The control information conveyed over the first wireless link controls conveyance of the data payload information over the second wireless communication link.

37 Claims, 10 Drawing Sheets

MULTI-STATION SUPPORT OF WIRELESS COMMUNICATIONS

BACKGROUND

Conventional wireless networks typically include one or more wireless stations to provide mobile communication devices access to a remote network such as the Internet. One type of wireless station is a CBSD (Citizen Broadband Radio Service Device).

In an example CBRS (Citizens Band Radio Service) network, each so-called CBSD (Citizen Broadband Radio Service Device) is assigned a certain amount of wireless spectrum from an entity such as a Spectrum Access Service (SAS).

One network communication standard supported by a CBSD is LTE (Long Term Evolution). According to the LTE standard, a certain part of the spectrum is utilized to transmit control channel information.

Each conventional CBSD (wireless station) transmits user data and control data in the allocated bandwidth to respective user equipment. The control channel is critical part of the communication. For example, without control information transmitted from a CBSD, it is not possible to convey any data communication over the allocated bandwidth to a mobile communication device.

BRIEF DESCRIPTION OF EMBODIMENTS

In contrast to conventional techniques, embodiments herein provide novel ways of providing improved wireless communications to one or more mobile communication devices in a network environment.

More specifically, in contrast to conventional techniques of implementing a single wireless station (such as a CBSD) to provide control and data channels to a mobile communication device, embodiments herein include providing control and data channels from different wireless stations in a network environment.

In one example embodiment, a communication system includes a control wireless station (such as a first wireless station) and one or more data payload-conveying wireless stations (such as second wireless stations). The data payload-conveying wireless stations rely on the control wireless station to provide control information to control conveyance of data over one or more data channels.

As a more specific example, to connect to a remote network, assume that a mobile communication device establishes a first wireless communication link with the first wireless station. The first wireless link conveys control information from the first wireless station to the mobile communication device. The mobile communication device establishes a second wireless communication link with a second wireless station. The second wireless link is established to convey data payload information. The control information conveyed over the first wireless link controls conveyance of the data payload over the second wireless communication link.

In one embodiment, in contrast to conventional techniques of providing control and data channels to a mobile communication device from a single wireless station, the second wireless station supporting data payload information is disparately located with respect to the first wireless station providing control information.

Note that further embodiments herein include establishing a communication link between the first wireless station and the second wireless station. Such a communication link conveys control information from the second wireless station to the first wireless station. Accordingly, in one embodiment, the second wireless station can be configured to provide control information to the first wireless station. The first wireless station communicates control information to the mobile communication device. The control information facilitates conveyance of data payload information between the second wireless station and the mobile communication device.

If desired, the first wireless station can be configured to communicate control information to both second wireless station and the mobile communication device to facilitate conveyance of data payload information from the second wireless station to the mobile communication device or data payload information from the mobile communication device to the second wireless station over the second wireless communication link (data link).

In accordance with further embodiments, the first wireless station is in communication with a bandwidth management resource such as an SAS (Spectrum Access Service). The first wireless station receives allocation of a first portion of bandwidth from the bandwidth management resource; the first portion of bandwidth is allocated to convey the control communications (over the first wireless communication link) to the mobile communication device. The second wireless station receives allocation of a second portion of bandwidth from the bandwidth management resource; the second portion of bandwidth is allocated to convey data payload communications (over the second wireless communication link).

In accordance with further embodiments, the first wireless station and second wireless station can be configured to receive bandwidth allocation information from any suitable resource. In one embodiment, the different portions of bandwidth are allocated from an available CBRS (Citizens Band Radio Service) band or other suitable shared spectrum.

As previously discussed, the first wireless station can be associated with multiple wireless stations. For example, in one embodiment, the first wireless station is associated with a third wireless station. The first wireless station conveys control information to control data payload communications over a wireless communication link between the third wireless station and a second mobile communication device. In a further embodiment, the third wireless station communicates control information to the first wireless station.

Further embodiments herein include registering the second wireless station with the first wireless station. For example, the second wireless station can be configured to generate a join message to join a control session provided by the first wireless station. In such an instance, the first wireless station receives a join message from the second wireless station requesting to register the second wireless station as a data-payload conveying wireless station with the first wireless station.

In one embodiment, in response to receiving the join message, assuming that the first wireless station accepts the registration request from the second wireless station, the first wireless station transmits a response communication to the second wireless station. The response communication indicates that the second wireless station has accepted the request and/or that the second wireless station has been registered with the first wireless station as a data payload-conveying wireless station. In a manner as previously discussed, subsequent to registration, the first wireless station provides control information facilitating conveyance of data payload information.

As an alternative to accepting the join request from the second wireless station, the first wireless station can be configured to, in response to receiving the join request message from the second wireless station (to join a control session), the first wireless station transmits a response communication to the second wireless station; the response communication indicates that the second wireless station has been denied from joining the control session provided by the first wireless station. This may occur when the first (control) wireless station does not have sufficient resources (such as bandwidth) available to support the second wireless station. Accordingly, the denial prevents the second wireless station from being registered with the first wireless station as a registered data payload-conveying wireless station.

In accordance with further embodiments, any wireless station (control or data wireless station) can request to be removed or unregistered in response to a remove (termination) request.

For example, in one embodiment, the first wireless station can be configured to receive a remove (terminate) request message from the second wireless station. In one embodiment, the remove request message indicates to terminate registration of the second wireless station with the first wireless station and corresponding control communication session as a data payload-conveying wireless station. In one embodiment, in response to receiving the remove request message from the second wireless station, the first wireless station transmits a response communication to the second wireless station. The response communication acknowledges that the second wireless station can be or has been removed as a data payload-conveying wireless station registered with the first wireless station.

In accordance with yet further embodiments, the first wireless station can be configured to communicate a remove request to the second wireless station. In such an instance, the second wireless station receives a remove request message from the first wireless station. Assume that the remove request message is a request to terminate registration of the second wireless station as a data payload-conveying wireless station registered with the first wireless station. In response to receiving the remove request message, the second wireless station transmits a response communication to the first wireless station. In one embodiment, the response communication indicates that the second wireless station accepts being removed as a data payload-conveying wireless station registered with the first wireless station. As an alternative to communicating an accept message, in response to receiving the remove request message, the second wireless station can be configured to transmit a response communication to the first wireless station indicating that the second wireless station rejects the request from being removed as a data payload-conveying wireless station registered with the first wireless station.

Further embodiments herein include establishing a communication link between the second wireless station and the for wireless station. As previously discussed, the communication link conveys control information from the second wireless station to the first wireless station. A quality of the communication link between the second wireless station and the first wireless station may need to be tested to verify its performance and ability to convey control information or messages in general.

In one embodiment, link quality management hardware disposed in the network environment is operable to measure a quality of a communication link conveying control information between the second wireless station and the first wireless station. The measured quality of the communication link indicates an ability to convey communications over the communication link between the first wireless station and the second wireless station.

As a more specific example, the link quality management hardware can be configured to measure a round-trip time of communications conveyed over a third communication link between the first wireless station and the second wireless station.

Embodiments herein are useful over conventional techniques. For example, splitting a service of providing control and data channels amongst multiple wireless stations enables improved use of wireless spectrum. For example, the data channels from one or more data wireless stations can be temporarily used to provide wireless services to entities other than mobile communication devices while the control wireless station maintains continued connectivity with the mobile communication device. When the data channel (or frequency spectrum, bandwidth, etc.) is available again, the data wireless stations support conveyance of data communications with the mobile communication devices.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices or hardware) to: establish a first wireless link between a first wireless station and a mobile communication device, the first wireless link conveying control information; establish a second wireless link between a second wireless station and the mobile communication device, the second wireless link conveying data payload information, the second wireless station disparately located with respect to the first wireless station, and wherein the control information is conveyed over the first wireless link to control conveyance of the data payload between over the first wireless communication link between the second wireless station and the mobile communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
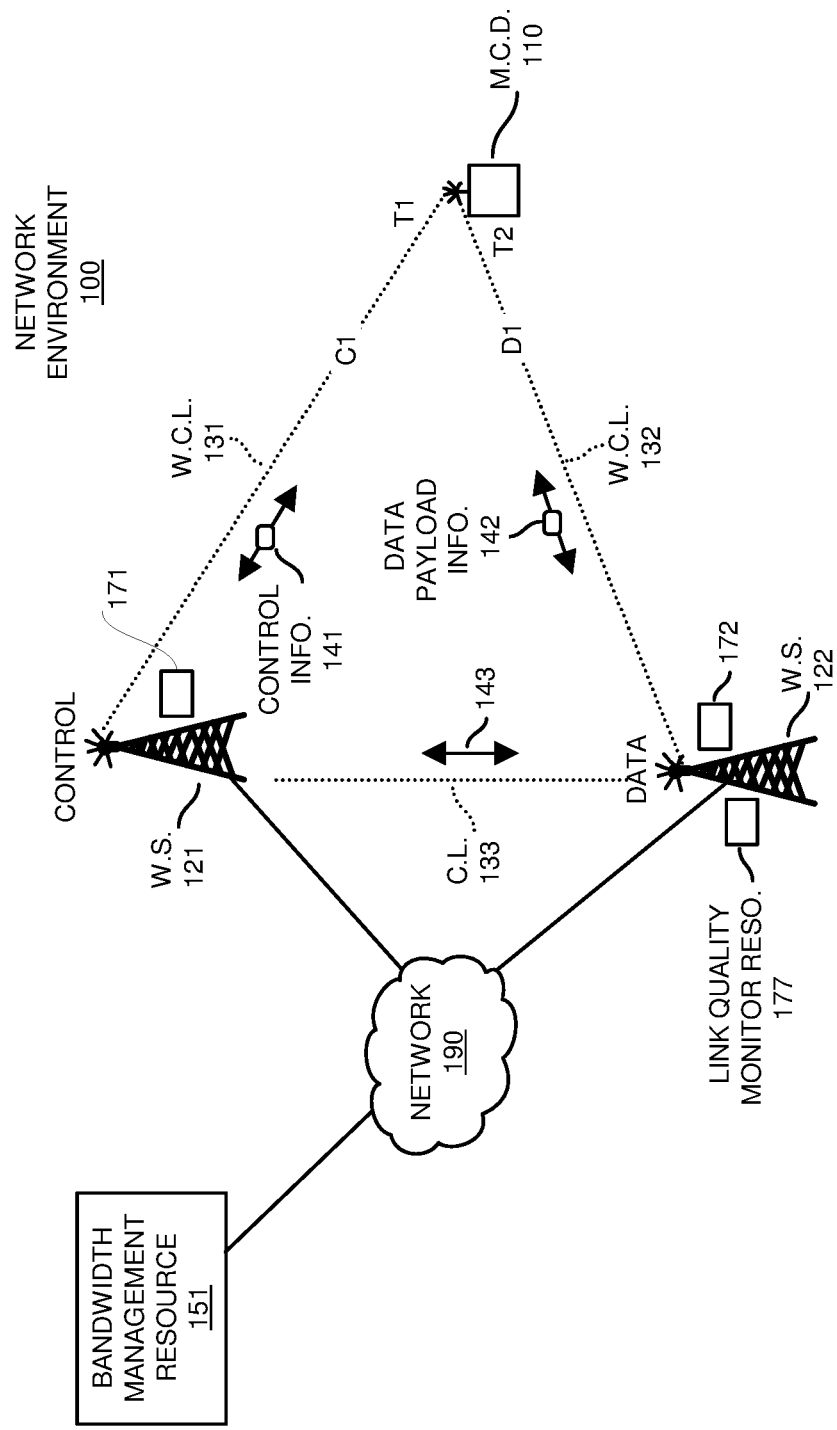
FIG. 1 is an example diagram illustrating a wireless network environment and splitting of a data channel and a control channel and corresponding delivery services amongst multiple wireless stations according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a communication system provides control and data channels from different wireless stations to a mobile communication device. For example, a communication system includes a control wireless station (first wireless station) and one or more data payload-conveying wireless stations (second wireless stations) that rely on the control wireless station to provide control information to control conveyance of data over one or more data channels from the data payload-conveying wireless stations to respective mobile communication devices.

Now, more specifically, FIG. 1 is an example diagram illustrating a wireless network environment in which data channel services and control channel services are split amongst multiple wireless stations according to embodiments herein.

As shown, network environment 100 includes wireless station 121, corresponding communication management resource 171 (such as a control management resource), wireless station 122, corresponding communication management resource 172 (such as a data management resource), network 190, mobile communication device 110, and bandwidth management resource 151.

Wireless communication link 131 provides control connectivity between the wireless station 121 and the mobile communication device 110. Wireless communication link 132 provides data connectivity between the wireless station 122 and the mobile communication device 110.

Note that each of the resources in network environment can be configured to include or be configured as appropriate hardware, software, or combination of hardware and software to carry out respective operations as discussed herein.

More specifically, the communication management resource 171 (or wireless station 121) can be implemented via communication management hardware and/or communication management software; the communication management resource 172 (or wireless station 122) can be implemented via communication management hardware and/or communication management software; bandwidth management resource 151 can be implemented via bandwidth management hardware and/or bandwidth management software; and so on.

As further shown, network environment 100 includes communication link 133 between the wireless station 122 and wireless station 121. Communication link 133 can be of any suitable type such as a wireless communication link, hardwired communication link, etc.

In one embodiment, the communication link 133 supports conveyance of control information such as from wireless station 122 to the wireless station 121. Communication link 133 also can be configured to support control or other communications from the wireless station 121 to the wireless station 122.

As previously discussed, embodiments herein include providing control and data channels to a mobile communication device 110 from different wireless stations in a network environment 100.

In one embodiment, mobile communication device includes transceiver T1 and transceiver T2.

Transceiver T1 includes a first wireless transmitter/receiver interface to communicate with wireless station 121 via first allocated bandwidth. For example, the transmitter of the transceiver T1 supports wireless communications from the mobile communication device 110 to the wireless station 121. The receiver of the transceiver T1 supports reception of wireless communications from the wireless station 121.

Transceiver T2 includes a first wireless transmitter/receiver interface to communicate with wireless station 122 via second allocated bandwidth. For example, the transmitter of the transceiver T2 supports wireless communications from the mobile communication device 110 to the wireless station 122. The receiver of the transceiver T2 supports reception of wireless communications from the wireless station 122.

More specifically, to connect to remote network 190, when first activated to establish a communication link with remote network 190, the mobile communication device 110 communicates a message to control wireless station 121 to establish a first wireless communication link 131 with the first wireless station 121. The first wireless link 131 (such as channel C1 supported by a first carrier frequency C) is allocated to wireless station 121 to convey control information 141 such as from the first wireless station 121 to the mobile communication device 110 or vice versa.

The mobile communication device 110 can be configured to select one of multiple wireless stations to establish a wireless communication link to convey data payload information. In this example embodiment, assume that the mobile communication device 110 selects data wireless station 122 as a resource supporting data communications. In such an instance, the mobile communication device 110 establishes a second wireless communication link 132 (such as channel D1 supported by a second carrier frequency) with the second wireless station 122. In one embodiment, the second wireless link 132 conveys data payload information 142 (in either direction) such as between the wireless station 122 and the mobile communication device 110.

The data payload information can be any suitable data. In one embodiment, the data payload information 142 is application data targeted for delivery to applications executing on the mobile communication device 110 or applications executing in hardware located in network 190.

As previously discussed, the control information 141 conveyed over the first wireless link 131 controls or facilitates conveyance of the data payload information 142 (such as application data) over the second wireless communication link 132 from the second wireless station 122 to the mobile communication device 110 or conveyance of data payload information from the mobile communication device 110 to the second wireless station 122.

In one embodiment, the control information 141 includes timing, schedule or other suitable information enabling the mobile communication device 110 to receive the data payload information from the wireless station 122 over the wireless communication link 132.

As shown, in contrast to conventional techniques using a single wireless station to provide both control channel and a data channel to a respective mobile communication device, the second wireless station 122 and the first wireless station 121 are disparately located with respect to each other and cooperate to provide a data channel and control channel to the mobile communication device 110.

More specifically, in accordance with further embodiments, the first wireless station 110 is in communication with bandwidth management resource 151. In one nonlimiting example embodiment, the bandwidth management resource is a so-called SAS (Spectrum Access Service) operable to provide allocation of one or more wireless channels from a shared spectrum such as different portions of bandwidth a so-called CBRS (Citizens Band Radio Service) band.

The wireless communication links 131, 132, etc., support any suitable type of wireless communications. In one embodiment, the wireless communication links support LTE communications.

Each of the wireless stations in network environment 100 communicates with the bandwidth management resource 151 to receive allocation of available wireless resources such as carrier frequency, transmit power level information, etc. The bandwidth management resource 151 can be configured to cooperate with other management resources to determine what wireless resources can be allocated to the wireless stations without interfering with superior users. In one embodiment, the wireless stations 121, 122, etc., are allocated a portion of an unlicensed frequency spectrum.

Via first allocation information, the first wireless station 121 receives allocation of a first portion of bandwidth such as a first carrier frequency from the bandwidth management resource; the first portion of bandwidth is allocated to convey control type communications (such as control information over the first wireless communication link 131). As previously discussed, the allocation information can include further information such as transmit power level information, carrier frequency, etc.

The second wireless station 122 receives allocation of a second portion of bandwidth such as a second carrier frequency from the bandwidth management resource 151; the second portion of bandwidth is allocated to convey data payload type communications (over the second wireless communication link 132). As previously discussed, the allocation information to the second wireless station 122 can include further information such as transmit power level information, carrier frequency, etc.

Assume that the wireless station 122 receives data payload information 142 for delivery to the mobile communication device 110. In one embodiment, to convey the data payload information 142 over the wireless communication link 132, the wireless station 122 conveys communications 143 (such as control information) over the communication link 133 to the wireless station 121. To further facilitate the transfer of data payload information 142, the wireless station 121 communicates appropriate control information 141 over the wireless communication link 131 to the mobile communication device 110. As previously discussed, wireless station 121 optionally communicates control information to the wireless station 122 for the delivery of data payload information 142.

In one embodiment, wireless communication link 132 supports only data communications. The communication link 133 and wireless communication link 131 ensures that appropriate control information 141 is provided to the mobile communication device 110.

Further embodiments herein include testing or verifying a performance of a communication link 133 between the wireless station 122 and the wireless station 121 to ensure that appropriate control information is delivered to the mobile communication device 110. The inability to convey communications over communication link 133 and or wireless communication link 131 may prevent the ability to convey data payload information 142 over the wireless communication link 132.

Network environment 100 further includes link quality monitoring resource 177. Link quality monitoring resource can be disposed at any suitable location. In one embodiment, link quality monitoring resource 177 (such as link quality management hardware or software at the wireless station 122) is operable to measure a quality of a respective communication link 133 conveying control information such as, in this case, between the wireless station 122 and the wireless station 121. Note that the measured quality of the tested communication link 133 indicates an ability of the communication link to convey communications.

In one embodiment, the link quality management resource 177 is operable to measure a round-trip time of communications conveyed over the communication link 133 between the second wireless station 122 and the first wireless station 121. Measuring round-trip time can include measuring a time difference between transmitting a ping communicated over the communication link 133 from the wireless station 122 to the wireless station 121 and receiving a respective ping response from the wireless station 121 over the communication link 133 at wireless station 122. If desired, the measured time can be compared to a threshold value to determine whether or not the communication link 133 provides sufficiently fast conveyance of communications to the wireless station 121.

Thus, the wireless station 122 can be configured to measure a data transmission latency from the wireless station 122 to the wireless station 121. As previously discussed, the wireless station 122 sends packets to the wireless station 121 to measure the round trip time (RTT) associated with each of multiple messages. In one embodiment, an average RTT should be lower than a first pre-defined threshold; and standard deviation of the average RTT should be lower than a second pre-determined threshold in order support quality communications with the mobile communication device. In one embodiment, both of these thresholds can be defined by the bandwidth management resource 151 and can be sent to each data wireless station during a (SAS) registration phase; or these pre-determined thresholds can be sent to each data wireless station after the registration phase.

In one embodiment, the link quality monitoring resource 177 initiates testing of the communication link 133 during IDLE moments (such as when not in use) of the communication link 133.

Note that further embodiments herein can include monitoring a bandwidth for lossiness (in which communications are dropped or lost) associated with communications transmitted over the communication link 133. For example, the link quality monitoring resource 177 can be configured to transmit one or more link quality measurement message from the wireless station 122 to the wireless station 121. In one embodiment, the transmitted message is used to measure the quality of the communication link 133 link. Based on a report associated with transmitting such test communications over the communication link 133, the link quality monitoring resource 177 generates a report. The corresponding performance report generated by the link quality management resource 177 can include parameters such as signal retransmission rate, data bit error rate, packet loss rate, and other quality parameters, associated with communicating over the communication link 133.

Note that the link quality message(s) transmitted over the communication link 133 to measure link quality can be sent at IDLE moments (when the communication link 133 is free of other communications) of the communication link 133, and before or after sending the control channel information 143 to the wireless station 121.

In one embodiment, if the link quality monitor resource 177 detects that the quality of transmitting communications over the communication link 133 is below a threshold value (such as because the round-trip time is above a threshold value, available bandwidth over communication link 133 is lower than a threshold value, data packet loss rate is higher than a threshold value, etc.), the link quality monitor resource 177 can be configured to attempt to pair the wireless station 122 with a different control wireless station in order to provide better connectivity to mobile communication device 110.

Figure 2:
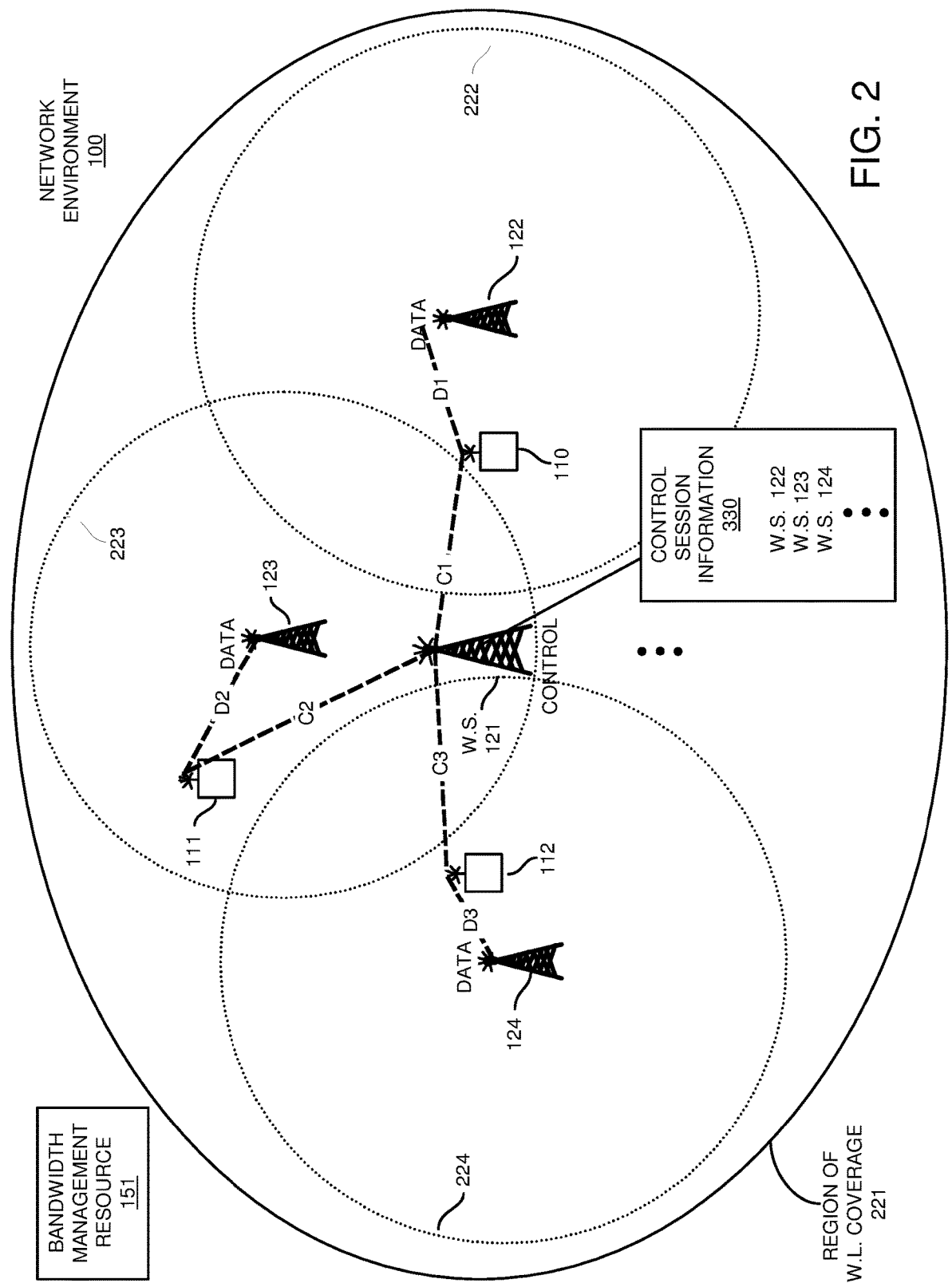
FIG. 2 is an example diagram illustrating a single allocated wireless station providing control information to multiple communication devices according to embodiments herein.

FIG. 2 is an example diagram illustrating a single wireless station and multiple data wireless stations connectivity multiple communication devices according to embodiments herein.

In this example embodiment, the wireless communication system in network environment 100 includes a control wireless station 121 and multiple data payload-conveying wireless stations (such as wireless station 122, wireless station 123, wireless station 124, etc.) that rely on or share use of services provided by the control wireless station 121 to convey data payload information over one or more data channels D1, D2, D3, etc.

Note that the network environment 100 and corresponding wireless networks can be created on as needed basis. For example, a single control wireless station 121 can support a control session in which multiple data wireless stations such as data wireless station 122, data wireless station 123, data wireless station 124, etc., (as indicated by control session information 330) rely on services the control wireless station 121 to control conveyance of data payload information over respective data links D1, D2, D3, etc.

More specifically, assume that the bandwidth management resource 151 allocates use of a first carrier frequency to support wireless communication channels/links C1, C2, C3, etc., to respective wireless stations 122, 123, 124, etc.

As previously discussed, the bandwidth management resource 151 can specify a transmit power level assigned to the control wireless station 121. The bandwidth management resource 151 allocates use of a one or more additional carrier frequencies to support wireless communication channels/links D1, D2, D3, etc.

Also, as previously discussed, the bandwidth management resource 151 can specify a transmit power level assigned to each of the data wireless stations 122, 123, 124, etc.

The assigned transmit power level assigned to each of the wireless stations 122, 123, 124, etc., can be substantially lower than the power level assigned to the wireless station 121. For example, the control wireless station 121 supports wireless communications in region of wireless coverage 221, which is substantially larger than each of the region of wireless coverage 222 (provided by wireless station 122), region of wireless coverage 223 (provided by wireless station 123), region of wireless coverage 224 (provided by wireless station 124), etc.

The bandwidth management resource 151 allocates use of a first carrier frequency to support communication channels C1, C2, C3, etc. Thus, the single channel or carrier frequency supports communications between the wireless station 121 and multiple mobile communication devices.

In this example embodiment, the control session information 330 indicates that the data wireless stations (122, 123, 124, etc.) are by the control wireless station 121.

As shown, the mobile communication device 110 is wirelessly connected to wireless station 121 via communication link C1 to receive respective control information facilitating conveyance of data payload information over wireless communication link D1 between wireless station 122 and mobile communication device 110.

The mobile communication device 111 is wirelessly connected to wireless station 121 via communication link C2 to receive respective control information facilitating conveyance of data payload information over wireless communication link D2 between wireless station 123 and mobile communication device 111.

The mobile communication device 112 is wirelessly connected to wireless station 124 via communication link C3 to receive respective control information facilitating conveyance of data payload information over wireless communication link D3 between wireless station 124 and mobile communication device 112; and so on.

In one embodiment, am, each of the communication links C1, C2, C3, is supported by a single assigned carrier frequency/wireless channel. Use of this wireless channel C can be divided up timewise/shared amongst entities (such as to convey control information) to target entities such as mobile communication devices 110, 111, 112, etc. More specifically, the channel or carrier frequency supporting channels C1, C2, C3, etc., can be a time slotted channel in which the wireless station 121 conveys control information to target mobile communication devices in different time slots. Additionally, or alternatively, the wireless station can be configured to tag communications with an appropriate identifier value indicating a respective target mobile communication device to which the control information is directed.

As a further example non-limiting example embodiment, assume that there are five wireless stations supported by the control wireless station 121 for the communication session as indicated by control session information 330. In such an instance, a first portion of the bandwidth of the carrier frequency allocated to wireless station 121 is used to support communications over communication link C1 to mobile communication device 110 or other mobile communication devices in region of wireless coverage 222; a second portion of the bandwidth allocated to wireless station 121 carrier frequency is used to support communications over communication link C2 to mobile communication device 111 and/or other mobile communication devices in region of wireless coverage 223; a third portion of the bandwidth allocated to wireless station 121 is used to support communications over communication link C3 to mobile communication device 112 or other mobile communication devices in region of wireless coverage 222; and so on.

As previously discussed, one or more carrier frequencies support data communications D1, D2, D3, etc. The corresponding one or more carrier frequencies/channels/bandwidth used to support data communications can be borrowed or temporarily used by another entity (such as to provide a high bandwidth data burst using the one or more carrier frequencies) while the mobile communication devices are still connected to the corresponding control wireless station 121 (via wireless channels/links C1, C2, C3, etc.). After the one or more wireless channels are available again, and the burst of data is received by the borrowing entity, the respective wireless stations 122, 123, 124, etc., use the one or more wireless data channels again to support communications with the respective mobile communication devices.

Note that the support of five wireless stations is shown by way of a non-limiting example embodiment. The control wireless station 121 can be configured to support any number of data wireless stations and mobile communication devices depending on available resources such as bandwidth. Further note that each of the data wireless stations can be configured to support any suitable number of mobile communication devices.

As previously discussed, to connect to remote network 190, when first activated to establish a communication link with remote network 190, the mobile communication device 110 communicates a message to control wireless station 121 to establish a first wireless communication link 131 with the first wireless station 121. The first wireless link 131 (such as channel C1 supported by a first carrier frequency C) is allocated to wireless station 121 to convey control information 141 such as from the first wireless station 121 to the mobile communication device 110 or vice versa.

In furtherance of obtaining access to remote network 190, the control wireless station 121 can be configured to communicate control information to the mobile communication device 110. In one embodiment, via the communicated control information, the wireless station 121 notifies the mobile communication device 110 of physical cell identities (PCIs) of the available data wireless stations 122, 123, 124, etc., in the network environment 100. Accordingly, the wireless station 121 notifies the mobile communication device 110 of candidate wireless stations available in network environment 100 to establish a data communication link.

In one embodiment, the control information communicated to the mobile communication device can further include RF symbols associated with each of the different data wireless stations.

In accordance with further embodiments, the mobile communication device can be configured to select a data wireless station (from the candidate wireless stations identified by the wireless station 121) in which to establish a respective wireless communication link for data communications. It is desirable that the mobile communication device 110 chooses a data wireless station that provides best connectivity with the mobile communication device 110.

To identify which data wireless station (such as candidate wireless station 122, 123, 124, etc.) to establish a corresponding data link, the mobile communication device 110 measures wireless signals (such as the RF symbols indicated in the control information received from the control wireless station) from each of the different data wireless stations. Based on a measured power level of different wireless signals received from the candidate data wireless stations (122, 123, 124, etc.) identified by the control wireless station 121, the mobile communication device 110 selects the data wireless station providing the strongest wireless signal to the mobile communication device 110.

In this example embodiment, assume that the mobile communication device 110 selects data wireless station 122 as a resource to support data link because the mobile communication device 110 receives a strongest signal from the wireless station 122. In such an instance, the mobile communication device establishes a second wireless communication link 132 (such as channel D1 supported by a second respective allocated carrier frequency/bandwidth) with the second wireless station 122. As previously discussed, the second wireless link 132 conveys data payload information 142 (in either direction) such as between the wireless station 122 and the mobile communication device 110.

In one embodiment, the data payload information 142 is application data targeted for delivery to applications executing on the mobile communication device 110 or applications executing in hardware located in network 190.

As further discussed below, the data wireless stations supported by or paired with the control wireless station can change over time. For example, as further discussed below, the data wireless stations supported by the control wireless station 121 can change based on one or more of the data wireless stations or control wireless station 121 requesting that a data wireless station join or be removed from a corresponding communication session of the wireless station 121.

Figure 3:
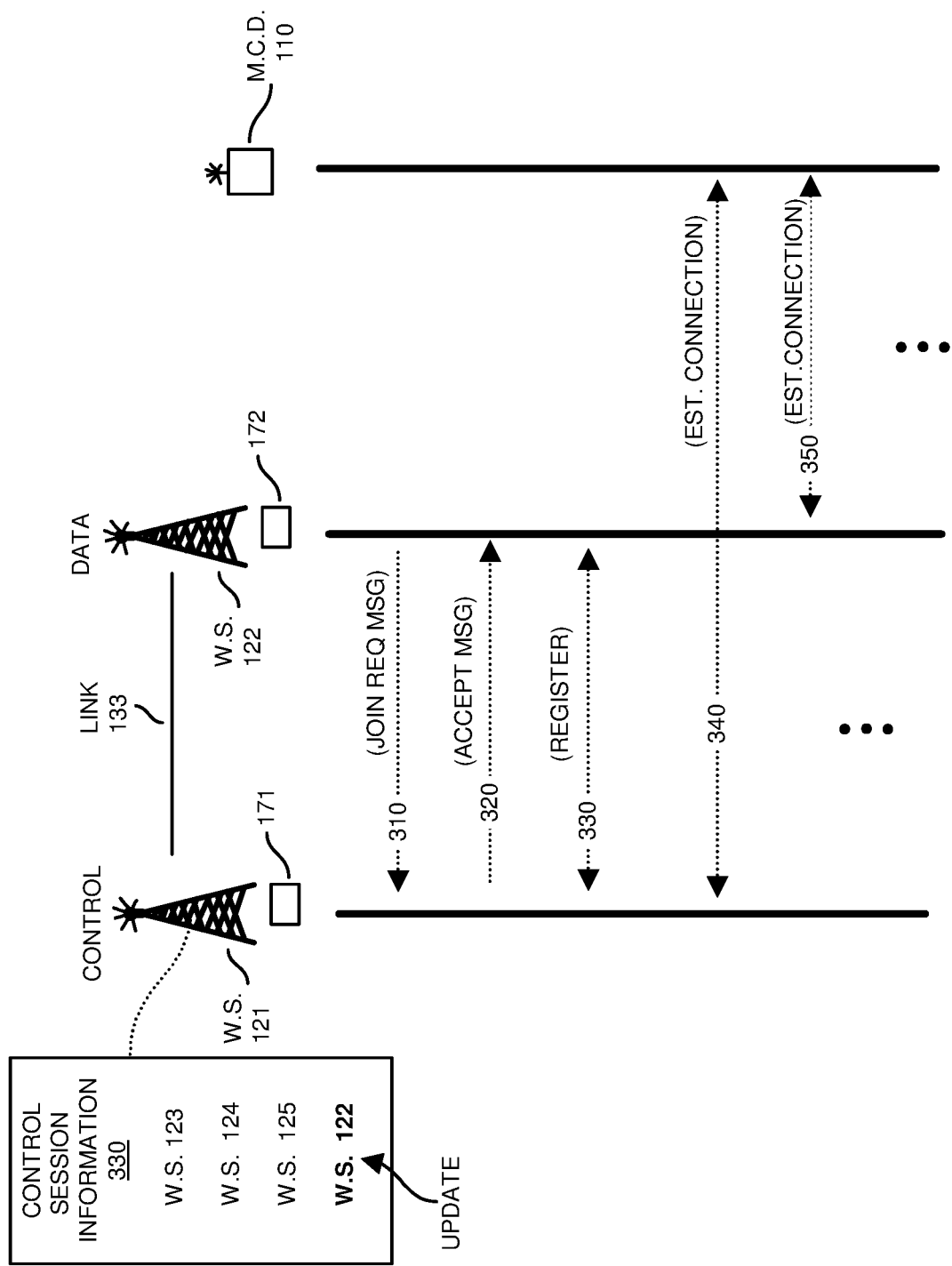
FIG. 3 is an example diagram illustrating an implementation of a join message and acceptance of joining a control session according to embodiments herein.

FIG. 3 is an example diagram illustrating an implementation of a join message and acceptance into a control session according to embodiments herein.

In this example embodiment, assume that the control wireless station 121 and corresponding communication management resource 171 keep track of control session information 330 indicating the different wireless stations supported by the control wireless station 121.

For example, assume that the control wireless station 121 initially supports distribution of control information to wireless station 123, wireless station 124, and wireless station 125 as indicated by the control session information 330. Wireless station 122 is not yet a member.

Assume further in this example embodiment that the wireless station 122 would like to join the control session associated with control wireless station 121. In such an instance, the communication management resource 172 of the wireless station 122 communicates a join request message 310 over communication link 133 to the communication management resource 171 of the control wireless station 121.

In response to receiving the join request message 310, the connection management resource 171 of the control wireless station 121 determines whether or not it has sufficient resources (such as available bandwidth) to provide support of conveying control information associated with wireless station 122.

Assume in this example embodiment that the control wireless station 121 has sufficient wireless bandwidth to support conveyance of control information on behalf of the wireless station 122. In such an instance, the communication management resource 171 of the control wireless station 121 transmits an accept message 320 to the data wireless station 122 indicating that the request to join the control session provided by the control wireless station 121 has been granted.

If needed, via communications 330, the connection management resource 172 of the data wireless station 122 registers with the connection management resource 171 of the control wireless station 121. In response to registering the data wireless station 122 as a supported entity, as further shown, the wireless station 121 updates the control session information 330 to indicate that the wireless station 122 is serviced by or paired with the control wireless station 121.

Subsequent to registering, the combination of the control wireless station 121 and the data wireless station 122 and corresponding resources are able to provide mobile communication device 110 connectivity to a respective wireless network. Wireless station 122 is a candidate data wireless station for any communication devices in region of wireless coverage 222 (FIG. 2).

Referring again to FIG. 1, as previously discussed, to receive data payload information associated with one or more applications executing on the mobile communication device 110, via communications 340, the mobile communication device establishes a first wireless communication link 131 with the control wireless station 121. Thereafter, the mobile communication device 110 establishes a respective connection via communications 350 with the selected wireless station 122 to establish the wireless communication link 132 for data communications.

As previously discussed, the control wireless station 121 communicates control information 141 to the mobile communication device 110 to support conveyance of data payload information 142 between the data wireless station 122 and mobile communication device 110 over the wireless communication link 132.

Thus, embodiments herein include registering the second wireless station 122 with the first wireless station 121 for receipt of control information to facilitate conveyance of data payload information 142.

Figure 4:
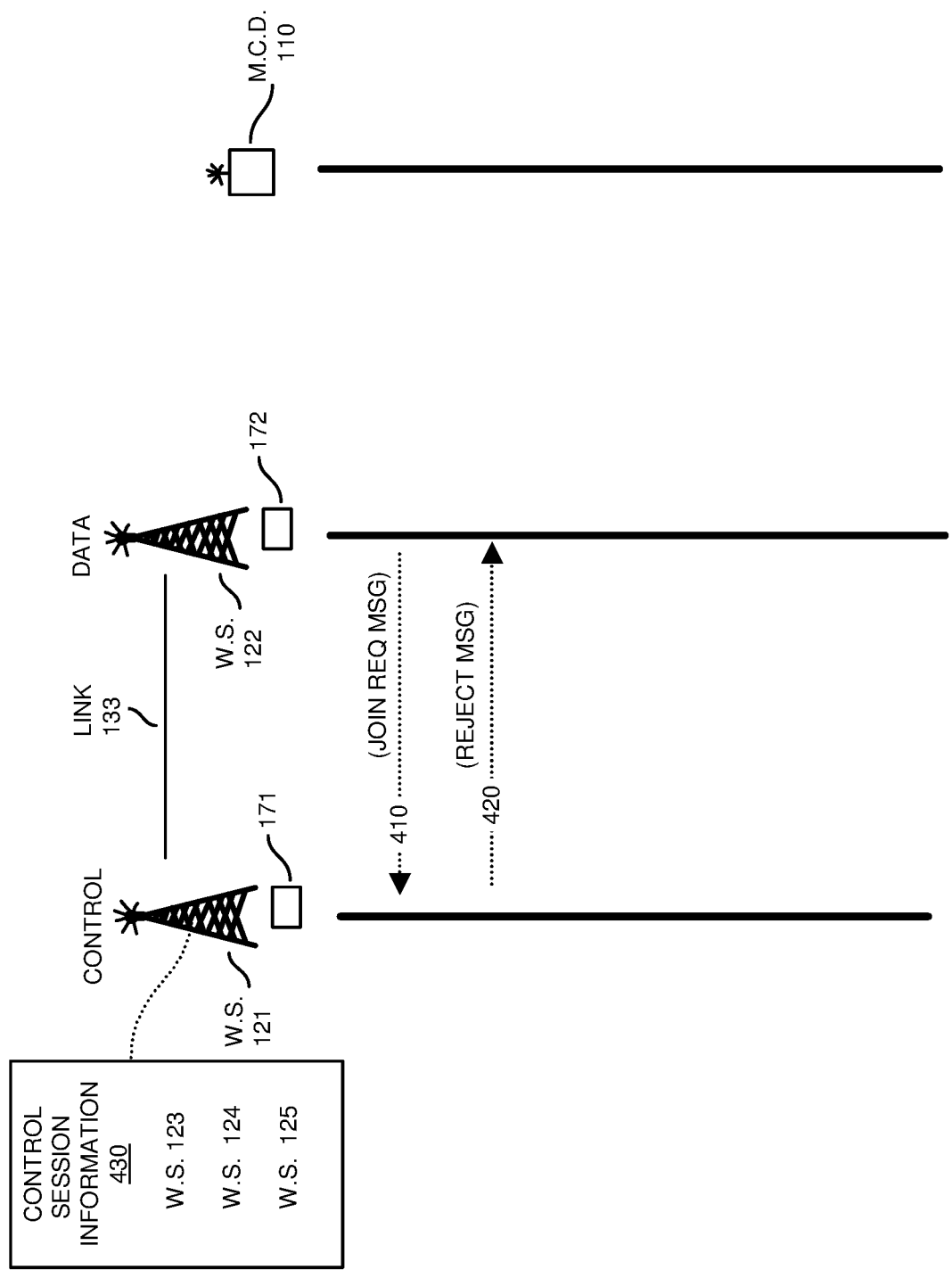
FIG. 4 is an example diagram illustrating an implementation of a join message and corresponding denial according to embodiments herein.

FIG. 4 is an example diagram illustrating an implementation of a join message and denial of acceptance into a control session according to embodiments herein.

In this example embodiment, assume that the wireless station 122 would like to join the control session associated with control wireless station 121. In such an instance, the communication management resource 172 of the wireless station 122 communicates a join request message 410 over communication link 133 to the communication management resource 171 of the control wireless station 121.

In response to receiving the join request message 310, the connection management resource 171 of the control wireless station 121 determines whether or not it has sufficient resources to provide support providing control information associated to wireless station 122.

In response to detecting that the connection management resource 171 does not have sufficient resources (such as bandwidth resources) to support the wireless station 122 and corresponding connection management resource 172, the connection management resource 171 of the control wireless station 121 communicates reject message 420 to the connection management resource 172 of the wireless station 122 to indicate that the join request has been denied.

The denial notification (communication 420) prevents the second wireless station 122 from being registered or paired with the first wireless station 121 as a registered data payload-conveying wireless station. Accordingly, the control session information 330 is not updated to indicate that the wireless station 122 and corresponding connection management resource 172 is a member.

Figure 5:
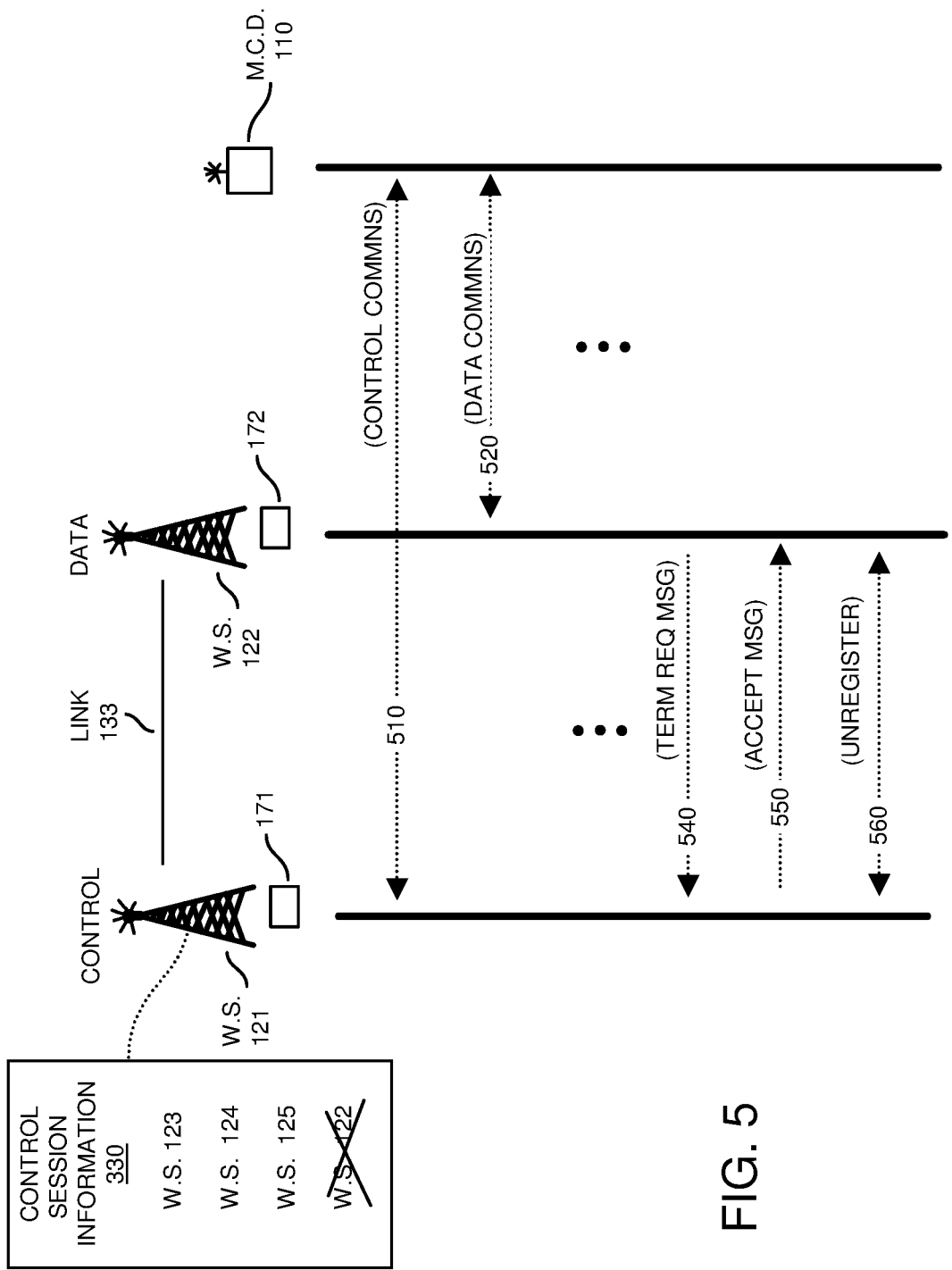
FIG. 5 is an example diagram illustrating a request to be removed from a control session and corresponding acceptance of the removal request according to embodiments herein.

FIG. 5 is an example diagram illustrating a request to be removed from a control session and corresponding acceptance according to embodiments herein.

The wireless station 121 communicates control communications 510 to the mobile communication device 110 to support data communications 520 (such as data payload information) between the wireless station 122 and the mobile communication device 110.

Assume in this example embodiment that the data wireless station 122 no longer wishes to be associated with or paired with the wireless station 121. In such an instance, the wireless station 122 transmits a termination request message (such as via communications 540) to the communication management resource 171 of the wireless station 121. Thus, the communication management resource 171 and wireless station 121 receive the termination (remove) request message from the second wireless station 122. As previously discussed, the remove request message (communications 540) indicate to terminate registration of the second wireless station 122 with the first wireless station 121 as a corresponding data payload-conveying wireless station.

In response to receiving the remove request message (communications 540), the wireless station 121 transmits communications 550 (such as an accept removal message) to the second wireless station 122. In such an instance, the communications 550 indicate that the request to remove the wireless station 122 from the control session information 330 has been accepted. In one embodiment, further communications 560 between the wireless station 121 and wireless station 122 complete termination or dissociation of the wireless station 122 with the wireless station 121.

As further shown, in response to accepting the request from the wireless station 122 to be dissociated from the wireless station 121, the communication management resource 171 updates the control session information 330 to remove an identity of the wireless station 122 (removed from control session information 330), indicating the termination. In such an instance, the control wireless station 121 no longer supports conveyance of control communications on behalf of the data wireless station 122.

Figure 6:
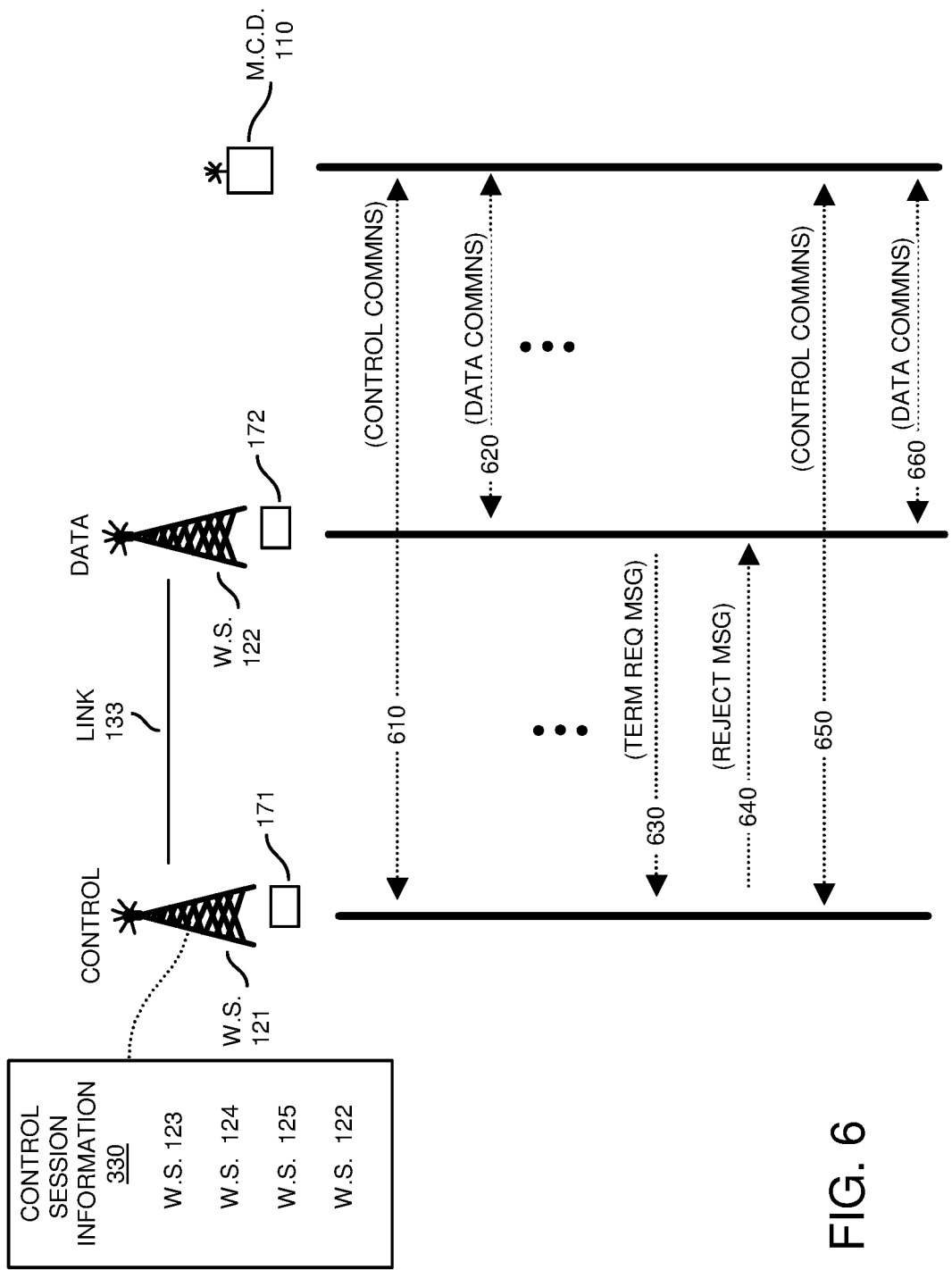
FIG. 6 is an example diagram illustrating a request to be removed from a control session and corresponding denial of removal from the control session according to embodiments herein.

FIG. 6 is an example diagram illustrating a request to be removed from the control session and corresponding denial according to embodiments herein.

Via communications 610, the mobile communication device 110 and the wireless station 121 exchange control communications in order to support conveyance of communications 620 (such as data payload information) between the wireless station 122 and the mobile communication device 110.

Assume in this example embodiment that the data wireless station 122 no longer wishes to be associated or paired with the wireless station 121 to provide control communications. In such an instance, the wireless station 122 transmits a termination request message (such as via communications 630) to the communication management resource 171 of the wireless station 121.

The wireless station 121 receives the termination (remove) request message from the second wireless station 122. The remove request message (communications 630) indicates to terminate registration of the second wireless station 122 with the first wireless station 121 as a candidate data payload-conveying wireless station.

In response to receiving the remove request message (communications 630), the wireless station 121 transmits communications 640 (such as a reject message) to the second wireless station 122. The communications 640 indicate that the request to terminate registration has been rejected by the wireless station 121.

If desired, because the wireless station 122 is not removed from the control session information 330, the combination of the wireless station 121 and wireless station 122 can provide the mobile communication device 140 (and/or one or more other mobile communication devices) connectivity (via communications 650 and 660) with a respective remote network.

Thus, because the termination request from the wireless station 122 to be dissociated from the wireless station 121 is rejected, the communication management resource 171 does not remove the identity of the wireless station 122 from the control session information 330. As mentioned, in such an instance, the control wireless station 121 continues to support conveyance of control communications on behalf of the data wireless station 122.

Figure 7:
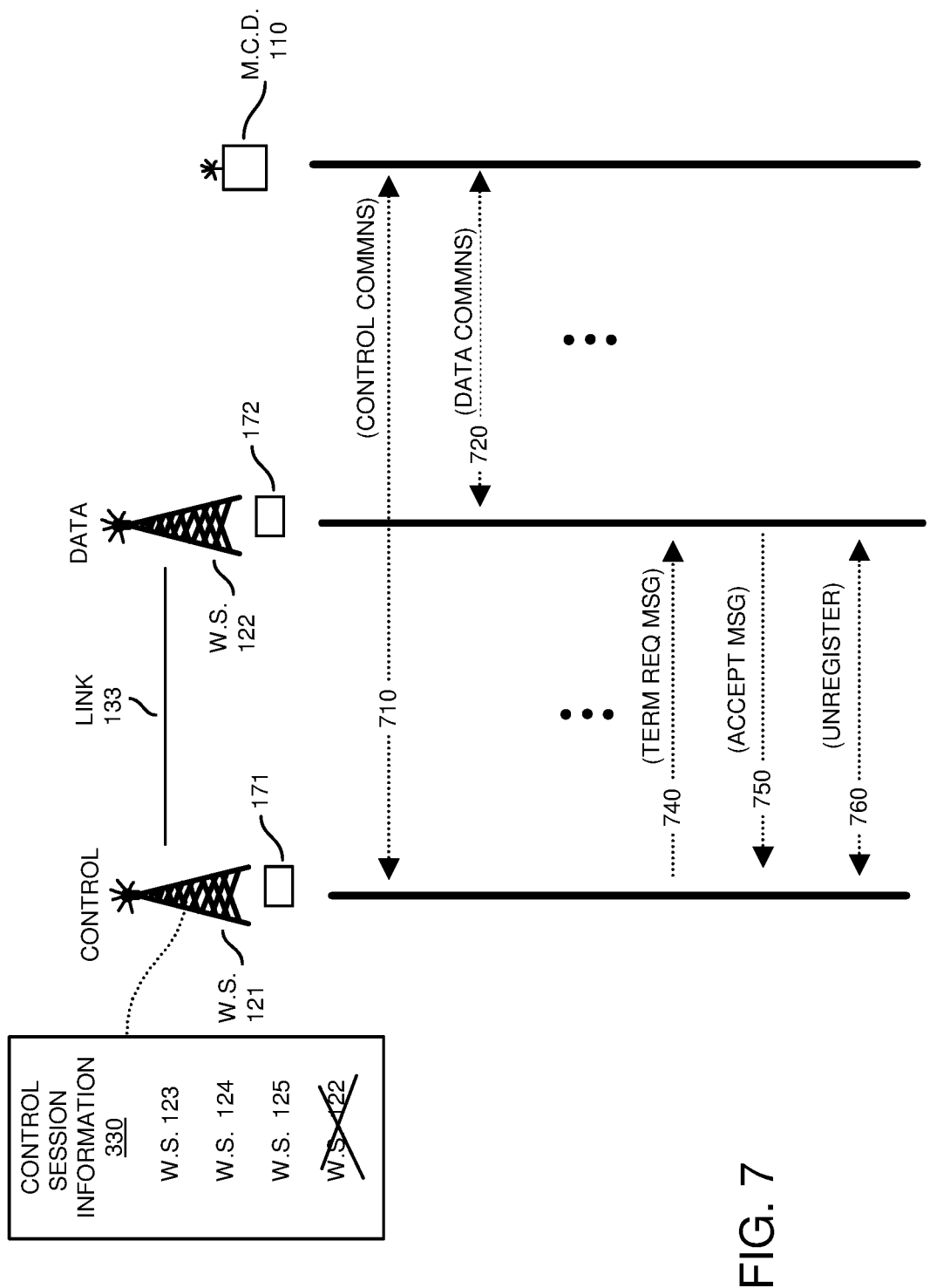
FIG. 7 is an example diagram illustrating a request to be removed from a control session and corresponding acceptance of removal from the control session according to embodiments herein.

FIG. 7 is an example diagram illustrating a request to be removed from a control session and corresponding acceptance according to embodiments herein.

Via communications 710, the mobile communication device 110 and the wireless station 121 exchange control communications in order to support conveyance of communications 720 (such as data payload information) between the wireless station 122 and the mobile communication device 110.

Assume in this example embodiment that the control wireless station 121 no longer wishes to support the wireless station 122 and corresponding data communications 720. In such an instance, the wireless station 121 transmits a termination request message to the communication management resource 172 of the wireless station 122 via communications 740. Thus, the communication management resource 172 and corresponding wireless station 122 receive the termination (remove) request message from the wireless station 121.

The remove (terminate) request message (communications 740) indicates that the wireless station 121 no longer wants to support wireless station 122 as an associated data payload-conveying wireless station.

In response to receiving the communications 740, the wireless station 122 transmits communications 750 (such as an accept termination message) to the wireless station 121. In this example embodiment, the communications 750 indicate that the request from the wireless station 121 accepts the disassociation request. In such an instance, further communications 760 between the wireless station 121 and wireless station 122 complete termination and dissociation of the wireless station 122 with the wireless station 121.

As further shown, in response to accepting the request from the wireless station 121 to be dissociated, the communication management resource 171 updates the control session information 330 to remove an identity of the wireless station 122 to indicate the termination and corresponding pairing of the wireless station 122 with the wireless station 121. In such an instance, as a result of the dissociation, the control wireless station 121 no longer supports conveyance of control communications on behalf of the data wireless station 122 because it has been removed as a member from the control session (as indicated by control session information 330) supported by the control wireless station 121.

Figure 8:
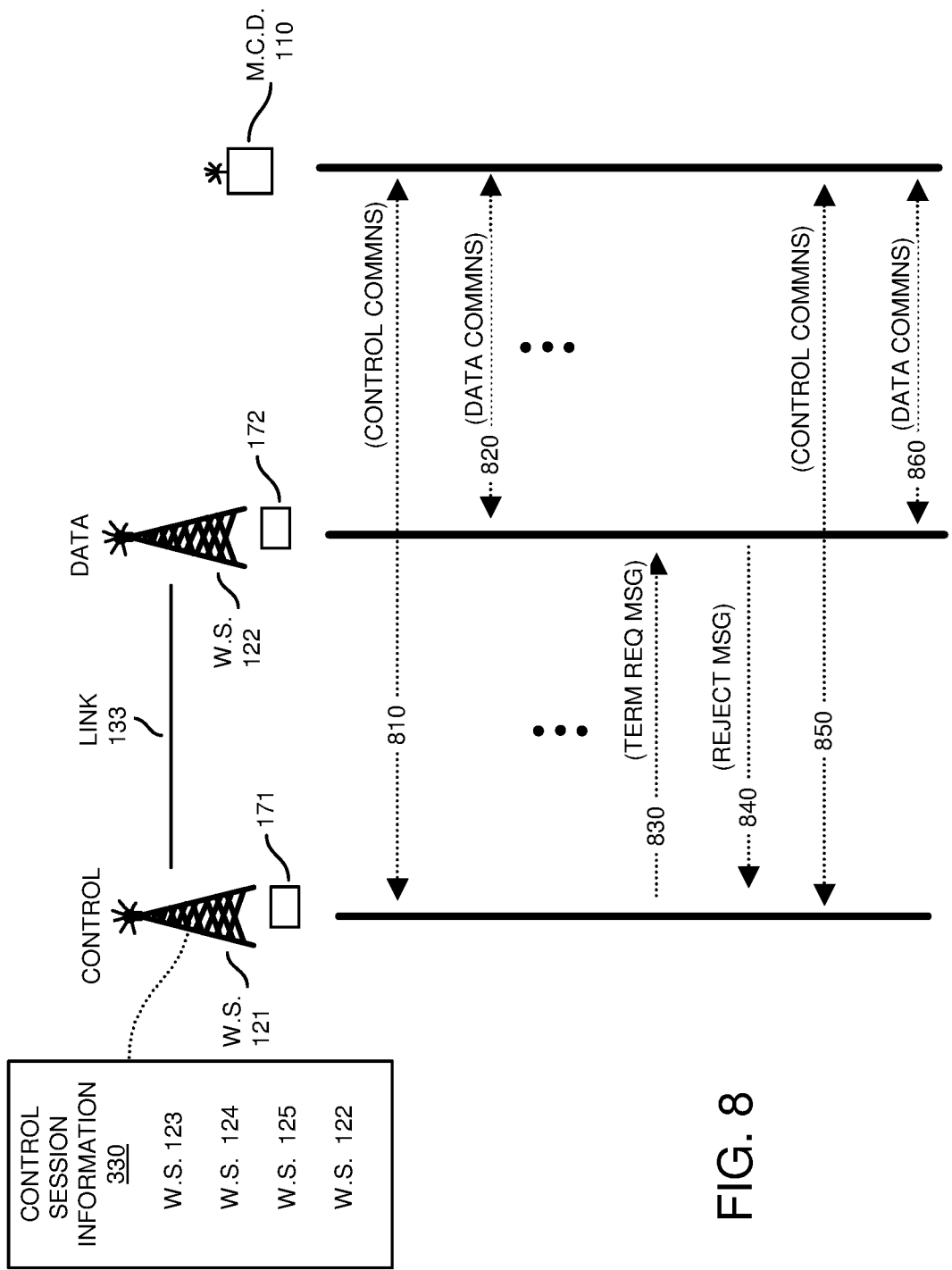
FIG. 8 is an example diagram illustrating a request to be removed from the control session and corresponding denial of removal from the control session according to embodiments herein.

FIG. 8 is an example diagram illustrating a request to be removed from the control session and corresponding denial according to embodiments herein.

Via communications 810, the mobile communication device 110 and the wireless station 121 exchange control communications in order to support conveyance of communications 820 (such as data payload information) between the wireless station 122 and the mobile communication device 110.

Assume in this example embodiment that the control wireless station 121 no longer wishes to or is no longer able to support the wireless station 122 and corresponding data communications 820. In such an instance, the wireless station 121 transmits a termination request message (via communications 830) to the communication management resource 172 of the wireless station 122. Thus, the communication management resource 172 and corresponding wireless station 122 receive the termination (remove) request message from the wireless station 121.

The remove (terminate) request message (communications 830) indicates that the wireless station 121 no longer wants to support wireless station 122 as an associated data payload-conveying wireless station.

Assume in this example embodiment that the wireless station 122 does not want to be removed from the control session supported by the control wireless station 121 (members indicated by control session information 330). In such an instance, in response to receiving the communications 830, the wireless station 122 transmits communications 840 (such as a reject removal message) to the wireless station 121. In this example embodiment, the communications 840 indicates rejection of the request from the wireless station 121 to perform a dissociation.

As further shown, in response to rejecting the request from the wireless station 121, the communication management resource 171 makes no changes to the control session information 330. That is, because the wireless station 122 and corresponding communication management resource 172 rejected the dissociation request from the wireless station 121, the wireless station 121 does not remove the identity of the wireless station 122 from the control session information 330.

The pairing of wireless station 121 and wireless station 122 support connectivity with mobile communication device 110 via communications 850 and 860.

Figure 9:
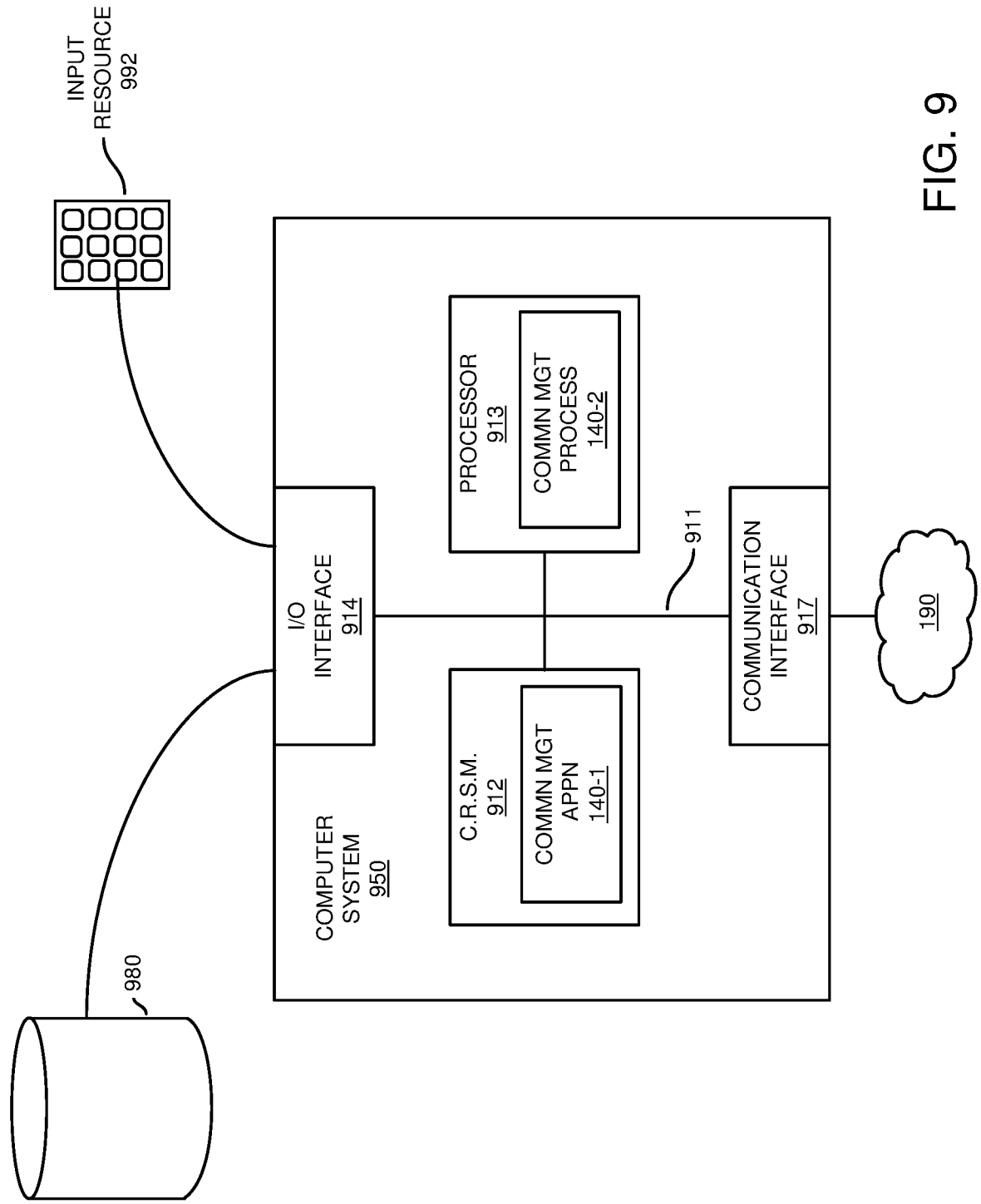
FIG. 9 is an example diagram illustrating example computer architecture operable to execute one or more operations according to embodiments herein.

FIG. 9 is an example block diagram of a computer system for implementing any of the operations as previously discussed according to embodiments herein.

Any of the resources (such as wireless station 121, connection management resource 171, wireless station 122, connection management resource 172, bandwidth management resource 151, etc.) as discussed herein can be configured to include computer processor hardware and/or corresponding executable instructions to carry out the different operations as discussed herein.

As shown, computer system 950 of the present example includes an interconnect 911 that coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
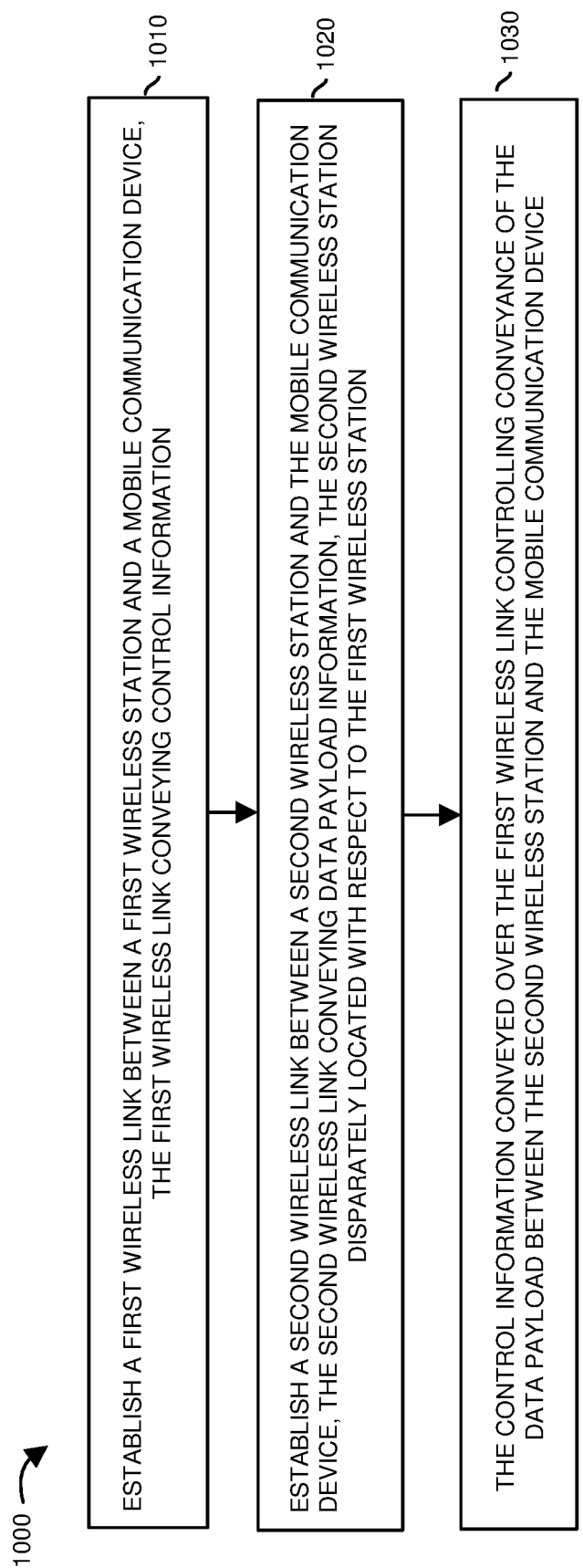
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the first wireless station 121 and the mobile communication device 110 establish a communication link 131 on which to convey control information 141.

In processing operation 1020, the second wireless station 122 and mobile communication device 110 establish a second wireless link 132 to convey data payload information 142. The second wireless station 122 is disparately located with respect to the first wireless station 121.

In processing operation 1030, the first wireless communication link 131 conveys control information 141 to control conveyance of the data payload information 142 over the second wireless communication link 132 between the second wireless station 122 and the mobile communication device 110.

Further Embodiments

Embodiments herein present a technique that transmits control and data channels in different CBSDs (wireless stations) in the network. Embodiments herein introduce new types of CBSDs called Control CBSDs (so-called control wireless stations) and Data CBSDs (so-called data wireless stations). In one embodiment, a single control CBSD can be configured to support multiple Data CBSDs.

Control CBSDs are responsible to transmit control information only; and data CBSDs are responsible to transmits user data only.

In one embodiment, each control channel in Control CBSD will be masked with the PCI (Physical Cell Identifier) of the CBSD of which control information is transmitted. The Control CBSD is only allowed to transmit control information of its first tier neighbors. User equipment in the network will sync with both the Control CBSD and a respective Data CBSD at the same time.

The Control CBSD of a particular Control CBSD-data CBSD pairing will carry all specific information about that data CBSD. The number of data CBSDs whose control information that will be carried by the Control CBSD can be determined by the SAS based on the geolocation and the neighbor list information associated with the Control CBSD. A control CBSD can be assigned more spectrum than data CBSD depending on the number of CBSDs whose control information will be carried. Wireless power transmit levels assigned to the Control CBSD and Data CBSD may be different such that the Control CBSD supports a substantially wider area of coverage (such as at least twice the coverage area) than the Data CBSD.

Note that, when a particular data CBSD is turned off; its control information will not be transmitted by control CBSDs.

Each Data CBSD will communicate with a corresponding Control CSBD over its communication interface/link for purposes such as:

1—To sign up as one of the Data CBSDs paired or partnered with the Control CBSD

2—To send its control information to the associated Control CBSD

In one embodiment, the control information that a respective Data CBSD sends to its supporting Control CBSD is information carried in Physical Downlink Control Channel (PDCCH), Physical Control Format Indicator Channel (PCFICH), Physical Broadcast Channel (PBCH), Physical Multicast Channel (PMCH) of Data CBSD.

Embodiments herein introduce novel messages such as:

1—Control Session Join Message (From Data CBSD to Control CBSD): This message is sent from Data CBSD to Control CBSD to sign up for control data transmission.

2—Control Session Join Accept/Reject Message (From Control CBSD to Data CBSD): This messages is sent from Control CBSD to Data CBSD to accept/reject the request coming from Data CBSD. If Control CBSD has wireless resources such as bandwidth to send control information of the requesting Data CBSD, Control CBSD will Accept the request; and if Control CBSD does not have any available wireless resources to send control information to the requesting Data CBSD, the Control CBSD will Reject the request from the Data CBSD to join the Control CBSD control session.

3—Control Session Remove Message: This message can be sent from Data CBSD or Control CBSD. If the message is sent from Control CBSD to Data CBSD; it means that Data CBSD wants to be removed from Control CBSD so that Control CBSD will stop transmitting Data CBSD's control channel information. If this message is sent from Control CBSD to Data CBSD then, Control CBSD wants to remove a particular Data CBSD from its list so that Control CBSD will stop transmitting its control channel information.

4—Control Session Remove Accept/Reject Message: This message is sent as a response to Control Session Remove Message. Receiving party (either Control CBSD or Data CBSD) will send Control Session Remove Accept message to accept to be removed or to be removed. Receiving party (either Control CBSD or Data CBSD) will send Control Session Remove Reject message not to accept to be removed or to be removed.

5—Latency Measurement Message (From Data CBSD to Control CBSD): This is used to measure data transmission latency from Data CBSD to Control CBSD. Data CBSD will send packets to Control CBSD to measure the round trip time of the message. Average RTT should be lower than pre-defined threshold; and standard deviation of the average RTT should be lower that pre-determined threshold. Both of these thresholds can be defined in the SAS and can be sent to each CBSD during SAS registration phase; or these pre-determined thresholds can be sent to each CBSD after the registration phase. This message will be sent over the X2 link during IDLE moments of X2 link.

6—Link Quality Measurement Message (From Data CBSD to Control CBSD): This message is used to measure the quality of the X2 link between Control CBSD and Data CBSD. This measurement report will include the signal retransmission rate, data bit error rate, packet loss rate, and other quality parameters. This message is sent to measure link quality at IDLE moments of the link, and before sending the control channel information to Control CBSD.

Note again that techniques herein are well suited to facilitate improved wireless communications via splitting of a data channel and a control channel amongst different wireless stations. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   establishing a first wireless link between a first wireless station and a mobile communication device, the first wireless link conveying control information;
   establishing a second wireless link between a second wireless station and the mobile communication device, the second wireless link conveying data payload information, the second wireless station disparately located with respect to the first wireless station;
   the control information conveyed over the first wireless link controlling conveyance of the data payload between the second wireless station and the mobile communication device;
   wherein the control information include schedule information controlling communication of the data payload from the second wireless station to the mobile communication device;
   wherein the second wireless station venerates the control information and communicates the control information to the first wireless station; and
   the method further comprising: measuring a quality of a third communication link between the first wireless station and the second wireless station, the quality of the third communication link indicating an ability to convey communications over the third communication link between the first wireless station and the second wireless station.

2. The method as in claim 1 further comprising:
   establishing the third communication link between the first wireless station and the second wireless station, the third communication link conveying the control information from the second wireless station to the first wireless station for delivery of the data payload information over the first wireless communication link.

3. The method as in claim 1 further comprising:
   at the first wireless station, receiving allocation of a first portion of bandwidth from a bandwidth management resource, the first portion of bandwidth allocated to convey control communications; and
   at the second wireless station, receiving allocation of a second portion of bandwidth from the bandwidth management resource, the second portion of bandwidth allocated to convey data payload communications.

4. The method as in claim 3, wherein the mobile communication device is a first mobile communication device, the method further comprising:
   establishing a third wireless link between the first wireless station and a second mobile communication device, the second mobile communication device receiving data payload information from a third wireless station over a fourth wireless link.

5. The method as in claim 1 further comprising:
   prior to establishing the first wireless link, at the first wireless station, receiving a join message from the second wireless station requesting to register the second wireless station as a data-payload conveying wireless station with the first wireless station.

6. The method as in claim 5 further comprising:
   in response to receiving the join message, transmitting a response communication from the first wireless station to the second wireless station, the response communication indicating that the first wireless station has accepted registration of the second wireless station as a data payload-conveying wireless station.

7. The method as in claim 5 further comprising:
   in response to receiving the join message, transmitting a response communication from the first wireless station to the second wireless station, the response communication indicating that the second wireless station has been denied registration with the first wireless station as a data payload-conveying wireless station.

8. The method as in claim 1 further comprising:
   measuring a round-trip time of communications conveyed over the third communication link between the first wireless station and the second wireless station.

9. The method as in claim 1 further comprising:
   at the first wireless station, receiving first allocation information from a spectrum access system, the first allocation information indicating a first wireless power output level in which to support communications over the first wireless communication link using first allocated bandwidth; and
   at the second wireless station, receiving second allocation information from the bandwidth management resource, the second allocation information indicating a second wireless power output level in which to support communications over the second wireless communication link using second allocated bandwidth.

10. The method as in claim 1, wherein the mobile communication device communicates a request to the first wireless station to establish the first wireless link prior to establishing the second wireless link with the second wireless station.

11. The method as in claim 1, wherein the control information includes timing information used by the mobile communication device to receive the data payload information from the second wireless station over the second wireless communication link.

12. The method as in claim 1, wherein the first wireless link is a control channel and the second wireless link is a data channel; and
   providing continued connectivity of the mobile communication device to the first wireless station via the first wireless link while the second wireless station is temporarily used to provide wireless services to at least one entity other than the mobile communication device.

13. The method as in claim 1, wherein the first wireless station is a first CBSD (Citizen Broadband Radio Service Device); and
   wherein the second wireless station is a second CBSD.

14. The method as in claim 1, wherein the first wireless station masks the first wireless link using a PCI (Physical Cell Identifier) of the first wireless link.

15. A method comprising:
   establishing a first wireless link between a first wireless station and a mobile communication device, the first wireless link conveying control information;
   establishing a second wireless link between a second wireless station and the mobile communication device, the second wireless link conveying data payload information, the second wireless station disparately located with respect to the first wireless station;
the control information conveyed over the first wireless link controlling conveyance of the data payload between the second wireless station and the mobile communication device, the method further comprising:
at the first wireless station, receiving a remove request message from the second wireless station, the remove request message indicating to terminate registration of the second wireless station with the first wireless station as a data payload-conveying wireless station supported by the first wireless station; and
in response to receiving the remove request message, transmitting a response communication from the first wireless station to the second wireless station, the response communication acknowledging acceptance of removing the second wireless station as a data payload-conveying wireless station registered with the first wireless station.

16. A method comprising:
establishing a first wireless link between a first wireless station and a mobile communication device, the first wireless link conveying control information;
establishing a second wireless link between a second wireless station and the mobile communication device, the second wireless link conveying data payload information, the second wireless station disparately located with respect to the first wireless station;
the control information conveyed over the first wireless link controlling conveyance of the data payload between the second wireless station and the mobile communication device, the method further comprising:
at the second wireless station, receiving a termination request message from the first wireless station, the termination request message being a request to terminate registration of the second wireless station as a data payload-conveying wireless station registered with the first wireless station; and
in response to receiving the termination request message, transmitting a response communication from the second wireless station to the first wireless station, the response communication indicating that the second wireless station accepts being removed as a data payload-conveying wireless station registered with the first wireless station.

17. A method comprising:
establishing a first wireless link between a first wireless station and mobile communication device, the first wireless link conveying control information;
establishing a second wireless link between a second wireless station and the mobile communication device, the second wireless link conveying data payload information, the second wireless station disparately located with respect to the first wireless station;
the control information conveyed over the first wireless in controlling conveyance of the data payload between the second wireless station and the mobile communication device the method further comprising:
at the first wireless station, receiving first allocation information from a bandwidth management resource, the first allocation information indicating a first wireless power output level in which to support communications over the first wireless communication link using first allocated bandwidth in an unlicensed spectrum; and
at the second wireless station, receiving second allocation information from the bandwidth management resource, the second allocation information indicating a second wireless power output level in which to support communications over the second wireless communication link using second allocated bandwidth in the unlicensed spectrum.

18. The method as in claim 17, wherein the first wireless bandwidth and the second wireless bandwidth are allocated via a spectrum access system from a CBRS (Citizens Band Radio Service) band.

19. The method as in claim 17, wherein the first wireless bandwidth and the second wireless bandwidth are allocated by a spectrum access system from a CBRS (Citizens Band Radio Service) band.

20. A system comprising:
a first wireless station in communication with a mobile communication device over a first wireless link, the first wireless link allocated to convey control information;
a second wireless station in communication with the mobile communication device over a second wireless link, the second wireless link allocated to convey data payload information, the second wireless station disparately located with respect to the first wireless station; and
the control information conveyed over the first wireless link to facilitate conveyance of the data payload information over the second wireless link between the second wireless station and the mobile communication device;
wherein the control information includes schedule information controlling communication of the data payload from the second wireless station to the mobile communication device;
wherein the second wireless station generates the control information and communicates the control information to the first wireless station; and
wherein a quality of a third communication lint between the first wireless station and the second wireless station is measured, the quality of the third communication link indicating an ability to convey communications over the third communication link between the first wireless station and the second wireless station.

21. The system as in claim 20, wherein the second wireless station is in communication with the first wireless station over the third communication link between the second wireless station and the first wireless station, the third communication link operable to convey control information from the second wireless station to the first wireless station to facilitate conveyance of the data payload information over the second wireless communication link.

22. The system as in claim 20, wherein the first wireless station receives allocation of a first portion of wireless bandwidth from a bandwidth management resource for the first wireless link; and
wherein the second wireless station receives allocation of a second portion of wireless bandwidth from the bandwidth management resource for the second wireless link.

23. The system as in claim 20, wherein the mobile communication device is a first mobile communication device, the system further comprising:
a third wireless station, the third wireless station in communication with a second mobile communication device over a third wireless communication link to convey data payload information, the first wireless station operable to control conveyance of control communications over the third wireless communication link to the second mobile communication device via control communications over a fourth wireless communication link between the first wireless station and the second mobile communication device.

24. The system as in claim 20, wherein the first wireless station is operable to receive a join message from the second wireless station to register the second wireless station with the first wireless station.

25. The system as in claim 24, wherein the first wireless station is operable to, in response to receiving the join message, transmit a response communication from the first wireless station to the second wireless station, the response communication indicating that the second wireless station has been registered with the first wireless station as a data-conveying wireless station.

26. The system as in claim 24, wherein the first wireless station is operable to, in response to receiving the join message, transmit a response communication from the first wireless station to the second wireless station, the response communication indicating that the second wireless station has been denied by the first wireless station as a registered data payload-conveying wireless station.

27. The system as in claim 20, wherein the first wireless station is operable to receive a termination request message from the second wireless station, the termination request message indicating to terminate registration of the second wireless station with the first wireless station as a data payload-conveying wireless station.

28. The system as in claim 20, wherein the second wireless station is operable to receive a termination request message from the first wireless station, the termination request message being a request to terminate registration of the second wireless station as a data payload-conveying wireless station registered with the first wireless station.

29. The system as in claim 20 further comprising:
link quality monitoring hardware to measure a round-trip time of communications conveyed over the third communication link between the second wireless station and the third wireless station.

30. The system as in claim 20 further comprising:
link quality monitoring hardware to measure a quality of the third communication link between the first wireless station and the second wireless station, the measured quality of the third communication link indicating an ability to convey communications over the communication link between the second wireless station and the first wireless station.

31. The system as in claim 20, wherein the first wireless station receives first allocation information from a bandwidth management resource, the first allocation information indicating a first wireless power output level in which to support communications over the first wireless communication link using a first carrier frequency; and
wherein the second wireless station receives second allocation information from the bandwidth management resource, the second allocation information indicating a second wireless power output level in which to support communications over the second wireless communication link using a second carrier frequency.

32. The system as in claim 31, wherein the first wireless bandwidth and the second wireless bandwidth are allocated from a CBRS (Citizens Band Radio Service) band.

33. Computer-readable storage hardware having instructions stored thereon, the instructions, when carried out by computer processor hardware, cause the computer processor hardware to:
establish a first wireless link between a first wireless station and a mobile communication device, the first wireless link conveying control information;
establish a second wireless link between a second wireless station and the mobile communication device, the second wireless link conveying data payload information, the second wireless station disparately located with respect to the first wireless station; and
the control information conveyed over the first wireless link controlling conveyance of the data payload between the second wireless station and the mobile communication device;
wherein the control information includes schedule information controlling communication of the data payload from the second wireless station to the mobile communication device;
wherein the second wireless station generates the control information and communicates the control information to the first wireless station; and
the computer processor hardware further operative to:
measure a quality of a third communication link between the first wireless station and the second wireless station, the quality of the third communication link indicating an ability to convey communications over the third communication link between the first wireless station and the second wireless station.

34. A method comprising:
establishing a first wireless link between a first wireless station and a mobile communication device, the first wireless link conveying control information;
establishing a second wireless link between a second wireless station and the mobile communication device, the second wireless link conveying data payload information, the second wireless station disparately located with respect to the first wireless station;
the control information conveyed over the first wireless link controlling conveyance of the data payload between the second wireless station and the mobile communication device;
at the second wireless station, receiving a termination request message from the first wireless station, the termination request message being a request to terminate registration of the second wireless station as a data payload-conveying wireless station registered with the first wireless station; and
in response to receiving the termination request message, transmitting a response communication from the second wireless station to the first wireless station, the response communication indicating that the second wireless station rejects being removed as a data payload-conveying wireless station registered with the first wireless station.

35. The method as in claim 34 further comprising:
subsequent to transmitting the response communication:
i) providing continued control communications from the first wireless station to the mobile communication device, and ii) providing continued data communications from the second wireless station to the mobile communication device.

36. A method comprising:
establishing a first wireless link between a first wireless station and a mobile communication device, the first wireless link conveying control information;

establishing a second wireless link between a second wireless station and the mobile communication device, the second wireless link conveying data payload information, the second wireless station disparately located with respect to the first wireless station; and the control information conveyed over the first wireless link controlling conveyance of the data payload between the second wireless station and the mobile communication device;

wherein the mobile communication device communicates a request to the first wireless station to establish the first wireless link prior to establishing the second wireless link with the second wireless station; and wherein the mobile communication device selects the second wireless station amongst multiple wireless stations registered with the first wireless station to support conveyance of data payloads.

37. A method comprising:

establishing a first wireless link between a first wireless station and a mobile communication device, the first wireless link conveying control information;

establishing a second wireless link between a second wireless station and the mobile communication device, the second wireless link conveying data payload information, the second wireless station disparately located with respect to the first wireless station; and the control information conveyed over the first wireless link, controlling conveyance of the data payload between the second wireless station and the mobile communication device;

wherein the first wireless link is a control channel and the second wireless link is a data channel;

the method further comprising: providing continued connectivity of the mobile communication device to the first wireless station via the first provide wireless services to at least one entity other than mobile communication device; and wherein the second wireless station supports conveyance of the data payload information again subsequent to the second wireless station being temporarily used to provide wireless services to the at least one entity other than mobile communication device.

* * * * *

UNITED STATES PATENT AND TRADEMARK OFFICE
CERTIFICATE OF CORRECTION

PATENT NO. : 10,966,264 B2
APPLICATION NO. : 16/118073
DATED : March 30, 2021
INVENTOR(S) : Volkan Sevindik and Haider H. Syed Page 1 of 1

It is certified that error appears in the above-identified patent and that said Letters Patent is hereby corrected as shown below:

In the Claims

Column 21, Line 30, Claim 1 delete "include" insert --includes--

Column 21, Line 34, Claim 1 delete "venerates" insert --generates--

Column 23, Line 50, Claim 17 after "and" insert --a--

Column 23, Line 57, Claim 17 delete "in" insert --link--

Column 24, Line 39, Claim 20 delete "lint" insert --link--

Column 28, Line 14, Claim 37 after "via the first" insert --wireless link while the second wireless station is temporarily used to- --

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*